TELEPHONE OPERATING ATTACHMENT

Filed Nov. 1, 1963 2 Sheets-Sheet 1

INVENTORS
HANK KLUMB
HENRY E. ROGERS
BY
Arthur H. Seidel
ATTORNEY

TELEPHONE OPERATING ATTACHMENT

Filed Nov. 1, 1963 2 Sheets-Sheet 2

INVENTORS
HANK KLUMB
HENRY E. ROGERS

BY Arthur H. Seidel

ATTORNEY

3,296,382
TELEPHONE OPERATING ATTACHMENT

Hank Klumb, 4732 N. Broad St., Philadelphia, Pa. 19141, and Henry Elliot Rogers, Philadelphia, Pa.; said Rogers assignor to said Klumb Filed Nov. 1, 1963, Ser. No. 320,667
6 Claims. (Cl. 179—99)

In general, this invention relates to a new and improved telephone operating attachment and more particularly to a simple attachment which can be easily fitted to any standard telephone set to actuate the plungers on the base thereof without the necessity of lifting the receiver but which will actuate the plungers upon normal raising of the receiver.

Telephone answering systems and automatic dialing systems, in the past, have utilized various methods of lifting the receiver (sometimes called hand set) from the cradle so that the spring biased plungers in the cradle will be free to move upwardly switching the telephone into an on position. For example, the telephone attachments of prior art devices utilized with telephone answering equipment would respond to the ringing of the telephone indicating that a call is being made to the particular set and would be operative to lift the receiver from the cradle so that recording equipment associated with the attachment could record and/or transmit messages for a predetermined period of time. After this period of time, the receiver or hand set would be lowered back into the cradle shutting off the telephone by depressing the plungers in the cradle.

These prior art devices, however, had many disadvantages. The most notable of these disadvantages related to the extremely complicated mechanical lift mechanisms which had to be designed for the receiver. Since the normal telephone sets are sold in different styles which have different weights, the lifting mechanism had to be designed for the heaviest receiver. Thus, the lifting mechanism might be too powerful for use with light receivers such as are found on the more modern telephones. With such light receivers, the receiver could be thrown out of all communication with the cradle thus rendering the answering service inoperative.

Since the lifting mechanism has to be designed for the heaviest hand set or receiver, it necessarily required a heavy lifting solenoid or the like which was expensive and bulky. Still further, most of the lifting mechanisms designed in prior art devices require that the lifting mechanism be moved out of the way when one wished to use the telephone in the normal manner. This required extra effort on the part of the user which was certainly not desirable.

Therefore, it is the general object of this invention to provide a new and improved telephone operating attachment for use with standard telephone sets.

Another object of this invention is the provision of a new and better telephone operating attachment for controlling the movement of the plungers of a telephone set without the necessity for lifting the receiver or hand set.

Still another object of this invention is the provision of a new and better telephone operating attachment for controlling the movement of the plungers on the base of the telephone set which will not interfere with the normal operation of the set when the receiver is lifted.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
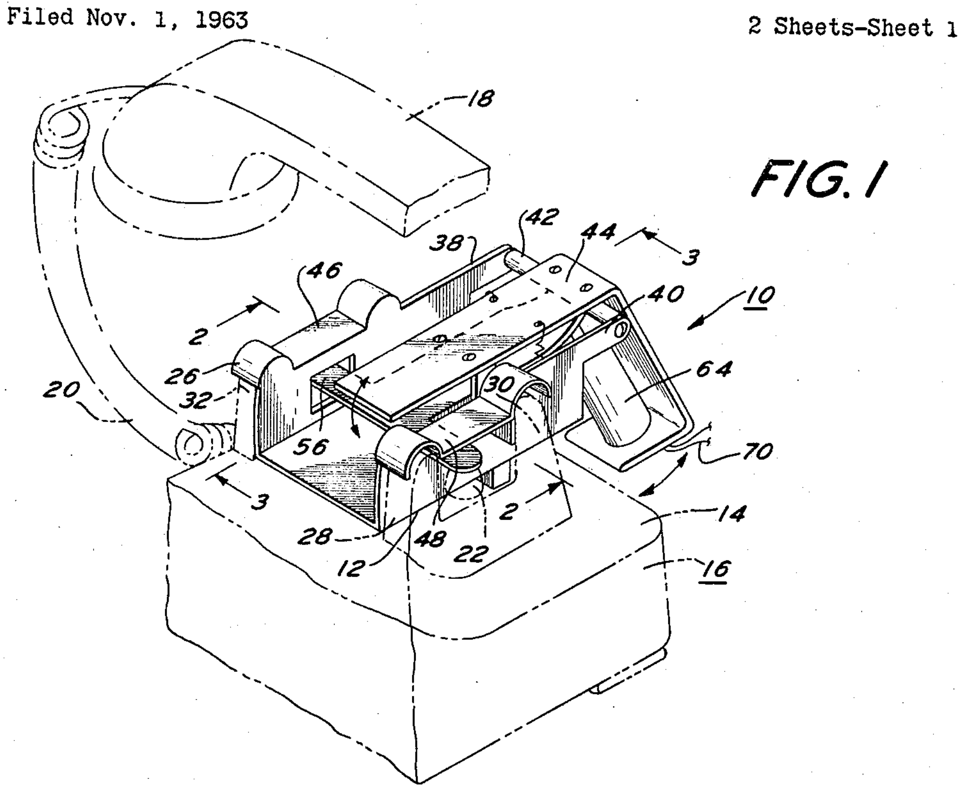
FIGURE 1 is a perspective view of the telephone operating attachment of the present invention, shown in place on a telephone set indicated in phantom.
Figure 2:
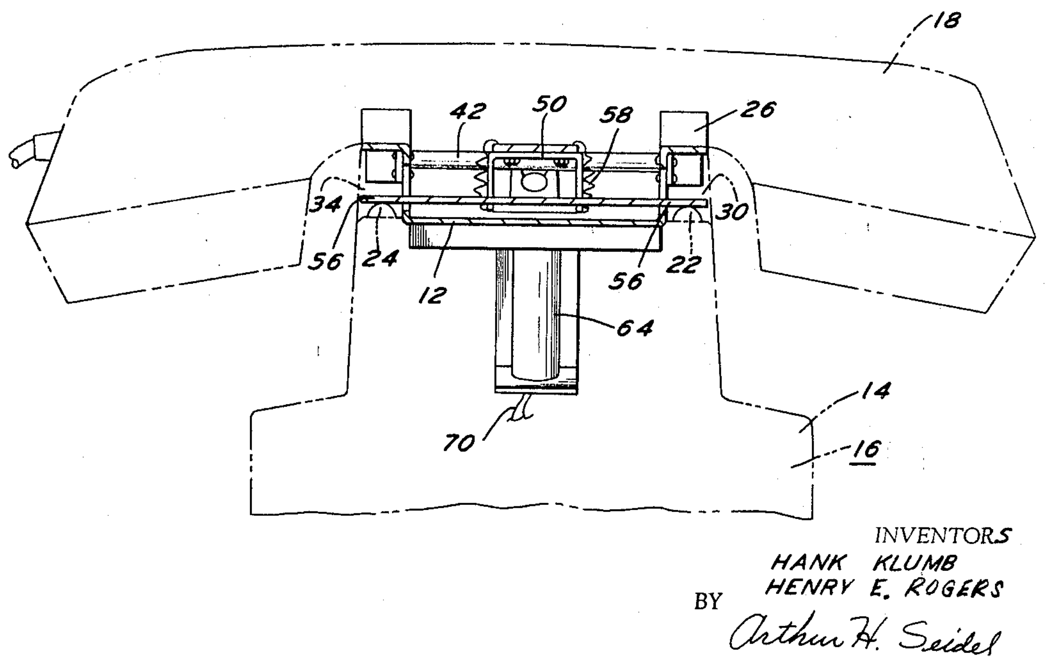
FIGURE 2 is a cross sectional view of the apparatus of FIGURE 1 taken along lines 2—2.

In FIGURE 1, there is shown the apparatus of the present invention generally designated by the numeral 10. The apparatus 10 is intended to be placed in the cradle 12 of a base 14 of a telephone set 16. The telephone set 16 includes a receiver or hand set 18 which is connected by a suitable telephone cord 20 to the base. The telephone set 16 can be any standard telephone set now being sold on the market in which a receiver is intended to rest in a cradle thus depressing plungers such as the spring biased plungers 22 and 24 mounted at the opposite ends of the cradle 12.

The apparatus 10 includes a suitable cradle mounting means 26 which in the present invention is a molded rigid unit conforming to the outline of the cradle 12. The cradle 12 includes two pairs of spaced posts 28 and 30; and 32 and 34. The recess between the posts 28, 30 and 32, 34 is spanned by the cradle mounting means 26 so as to allow free movement of the spring biased plungers 22 and 24.

The cradle mounting means 26 has a pair of spaced backwardly extending brackets 38 and 40 at the end of which is positioned a suitable rotatably mounted rod 42. Rod 42 extends perpendicular to the brackets 38 and 40 and forms an axis for the receiver supporting piece 44. Receiver supporting piece 44 is fixedly secured to the rod 42 and extends in a forward direction between the pairs of spaced posts 28, 30 and 32, 34. The receiver supporting means 44 is in the same plane as the flat portions 46 and 48 of the cradle mounting means 26 which flat portions overlie the recesses for the plungers 22 and 24. The receiver supporting means 44 has an inverted U-shaped bracket 50 secured to the underside thereof betwen the cradle 12 and the rod 42. The inverted U-shaped bracket 50 maintains the receiver supporting piece 44 in the same plane as the flat portions 46 and 48.

The downwardly extending legs of the inverted U-shaped bracket 50 have a second pivot rod 52 connected at the outer extremities thereof. Rod 52 is integrally connected with a plunger pivot bar 54 which is T-shaped having a plunger depression portion 56 extending into the recesses between upright spaced posts 28, 30 and 32, 34 through suitable openings in the cradle mounting means 26. The plunger depression portion 56 has the outer ends thereof extending over the plungers 22 and 24.

The plunger depression portion 56 is biased away from the receiver supporting piece 44 by a suitable pair of tension springs 58 connected between the plunger pivot bar 54 and the receiver supporting piece 44 on the side of the bracket 50 opposite from the cradle 12. The plunger pivot bar 54 is limited in its movement as produced by the tension spring 58 by reason of a bifurcation extension 60 which is curved toward the receiver supporting piece 44 and abuts in its limit stop position the rotatably mounted rod 42.

The receiver supporting piece 44 has integral therewith an angled extension 62 connected adjacent the rotatably mounted rod 42. The angled extension 62 supports a solenoid 64 with a rod-shaped actuater 66 passing between the bifurcated extension 60 with an enlarged head portion 68 preventing the actuater rod 66 from being pulled downwardly out of the bifurcated extension 60.

The solenoid 64 is intended to be actuated through suitable conductors 70 in many systems where, at present, the receiver is normally lifted. In these systems, the receiver is lifted to release the plungers so that an automatic answering system can operate.

Figures 3, 4, 5:
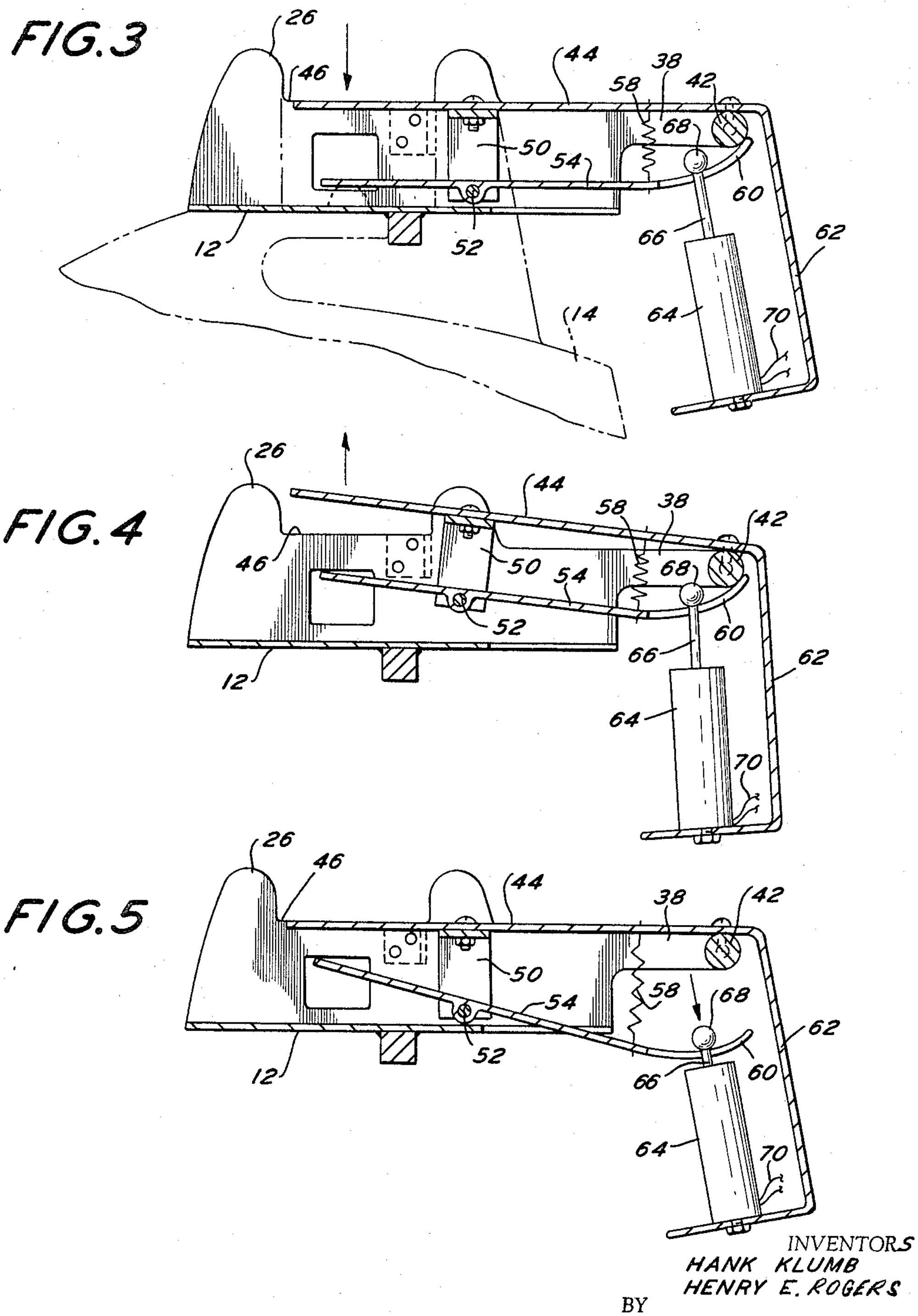
FIGURE 3 is a cross sectional view of the apparatus of FIGURE 1 taken along lines 3—3 with the telephone hand set or receiver in the cradle.
FIGURE 4 is a cross sectional view similar to FIGURE 3 showing the apparatus of the present invention when the hand set or receiver has been lifted.
FIGURE 5 is a cross sectional view of the apparatus of the present invention similar to FIGURES 3 and 4 shown with the receiver in the cradle and the plunger operating mechanism actuated.

The operation of the apparatus shown in FIGURES 1–5 is as follows:

As shown in FIGURE 3, the receiver 18 is placed in the cradle 12 resting between the spaced posts 28, 30 and 32, 34 on the receiver supporting piece 44 and the flat portions 46 and 48. The receiver itself does not depress the plungers 22 and 24, but the plunger depression portion 56 of the plunger pivot bar 54 presses the plungers 22 and 24 downwardly against their spring bias to maintain the telephone set in the off position. The plunger depression portion 54 is so biased by the springs 58 which pull the plunger pivot bar 54 about pivot rod 52 until the bifurcated extensions 60 abut the rotatably mounted rod 42. Springs 58 applies a greater movement to plunger pivot bar 54 than do the spring biases of plungers 22 and 24.

If the receiver 18 is lifted, the apparatus 10 assumes the position shown in FIGURE 4. That is, the spring biased plungers 22 and 24 force the plunger depression portion 56 upwardly rotating the receiver supporting piece 44, the inverted U-shaped bracket 50, the plunger pivot bar 54, the angled extension 62, and the solenoid 64 about the rotatably mounted rod 42. The rotation of the plunger depression portion 56 and thus the receiver supporting piece 44 is stopped by the underside of the flat portions 46 and 48 of the cradle mounting means 26. Thus, the receiver 18 of the telephone set can be lifted in the normal manner to facilitate manual dialing of the telephone. There will be no interference in this function of the telephone set 16 by the apparatus 10.

In FIGURE 5, there is shown the apparatus 10 when the receiver 18 is in place on the cradle 12 maintaining the receiver supporting piece 44 in the horizontal plane of the flat portions 46 and 48. In FIGURE 5, the solenoid 64 has been actuated by reason of the receipt of a telephone call signal so as to turn the telephone set "on." The telephone set is turned "on" by releasing the plungers 22 and 24. This is accomplished by the actuation of the solenoid 64 which retracts the actuation rod 66 pulling the bifurcated extensions 60 downwardly because of the enlarged head 68. The bifurcated extensions 60 provide a guide slot for the actuation rod 66. It will be understood that in the other mechanical device for achieving guided movement of the actuation rod during pivoting of the plunger pivot bar 54 could be utilized according with the principles of the present invention.

The downward movement of the actuation rod 66 causes pivoting of the plunger pivot bar 54 about the pivot rod 52 against the tension of the springs 58. Rotation of the plunger pivot bar 54 raises the plunger depression portion 56 so that the plungers are released and the telephone will be turned "on." Of course, deenergization of the solenoid 64 will cause the tension springs 58 to return the plunger depression portion 56 to the starting position shown in FIGURE 3.

Thus, the objects of the present invention have been achieved by the provision of a new and better telephone operating attachment which will not interefere with the normal use of the telephone but will release the plungers of the telephone upon receipt of a suitable signal without the necessity for lifting the receiver. Thus, there is no need for special heavy duty solenoids to lift receivers of various weights, as the weight of the receiver has no bearing on the design of the unit. Further, this device is simple and inexpensive to manufacture and it can be utilized on most models of telephone sets presently being sold.

The present invention may be embodied in other specific forms without departing from the spirit or essential attributes thereof and, accordingly, reference should be made to the appended claims, rather than to the foregoing specification as indicating the scope of the invention.

We claim:

1. A telephone operating attachment adapted to be mounted on the cradle of a telephone adjacent the plunger mechanism thereof, said attachment comprising mounting means for mounting the attachment on the cradle without interfering with the operation of the plunger mechanism, a receiver responsive portion supported by said mounting means, a plunger depressor supported by said receiver responsive portion, said plunger depressor being mounted for movement between a first and second position, said receiver responsive portion being mounted for movement between a third and fourth position, said receiver responsive portion in said third position having a telephone receiver resting thereon in the cradle, said plunger depressor in said first position being engaged with said plunger mechanism, means coupled to said plunger depressor for normally biasing said plunger depressor to said first position when said receiver responsive portion is in said third position, said plunger depressor being disengaged from said plunger mechanism when said receiver responsive portion is in said fourth position, said receiver responsive portion being disengaged from said receiver in said fourth position, and plunger depressor actuating means, said plunger depressor actuating means being operative to disengage said plunger depressor from said plunger mechanism by moving said plunger mechanism to said second position when said receiver responsive portion is in said third position.

2. The telephone operating attachment of claim 1 wherein said means for normally biasing said plunger depressor to said first position includes spring biasing means, said plunger depressor having a plunger engaging portion, said spring biasing means biasing said plunger engaging portion away from said receiver responsive portion, said spring biasing means biasing said plunger depressor with a force greater than the force on said plunger depressor by said plunger mechanism when said plunger depressor is in said first position.

3. A telephone operating attachment comprising mounting means for mounting the attachment on a telephone, a receiver responsive portion supported by said mounting means, a plunger depressor supported by said receiver responsive portion, said plunger depressor being independently movable with respect to said receiver responsive portion, and means normally biasing said plunger depressor away from said receiver responsive portion, and actuating means operative to move said plunger depressor toward said receiver responsive portion upon receipt of a suitable signal.

4. The telephone attachment of claim 3 wherein said receiver responsive portion is pivotally mounted on said mounting means, limit stops limiting the angular rotation of said receiver responsive portion, said actuator being mounted on an extension of said receiver responsive portion.

5. The telephone operating attachment of claim 4 wherein said plunger depressor is rotatably mounted on said receiver responsive portion, said actuator including a solenoid having a reciprocally movable rod, and guide means for guiding said actuator rod to effect rotation of said plunger depressor in accordance with reciprocation of said actuator rod.

6. The telephone operating attachment of claim 5 wherein said mounting means includes a part thereof conforming to the shape of the cradle of a telephone, said part having flat receiver resting portions overlying and spaced above the plungers of the telephone to allow free movement of the plungers, said mounting means portion having suitable openings therein to allow movement of said plunger depressor to depress said telephone plungers and to release said depressed telephone plungers, said mounting means acting as a limit stop for movement of said plunger depressor between said last-mentioned two positions.

References Cited by the Examiner

UNITED STATES PATENTS

| | | | |
|---|---|---|---|
| 2,952,740 | 9/1960 | Montrose ---------- | 179—90.1 |
| 3,135,831 | 6/1964 | Youtle --------------- | 176—6 |

KATHLEEN H. CLAFFY, *Primary Examiner.*

J. W. JOHNSON, A. H. GESS, *Assistant Examiners.*